US00RE37635E

(19) United States
(12) Reissued Patent
Clark et al.

(10) Patent Number: US RE37,635 E
(45) Date of Reissued Patent: Apr. 9, 2002

(54) SYSTEM FOR ENABLING DECODING OF BAR CODE AND OTHER SYMBOLS WITH A DIGITAL MICROCOMPUTER CONNECTED VIA THE INPUT/OUTPUT PORT THEREOF TO THE SCANNER

(75) Inventors: Timothy J. Clark, Orange, CA (US); Shoeb Ansari, Arlington, TX (US)

(73) Assignee: PSC Inc., Webster, NY (US)

(21) Appl. No.: 09/136,885

(22) Filed: Aug. 19, 1998

Related U.S. Patent Documents

Reissue of:
(64) Patent No.: 5,557,095
Issued: Sep. 17, 1996
Appl. No.: 08/443,549
Filed: May 18, 1995

U.S. Applications:

(63) Continuation of application No. 08/283,923, filed on Aug. 1, 1994, now abandoned, which is a continuation of application No. 08/059,796, filed on May 10, 1993, now abandoned.

(51) Int. Cl.[7] ..... G06F 7/00
(52) U.S. Cl. ..... 235/462.15; 235/375; 235/382
(58) Field of Search ..... 235/462.15, 462.27, 235/462.46, 462.16, 462.18, 449, 470, 437, 382, 385, 375, 472.01, 472.02; 340/825.31; 380/25

(56) References Cited

U.S. PATENT DOCUMENTS

| | | | | |
|---|---|---|---|---|
| 4,360,798 A | * | 11/1982 | Swartz et al. | 235/462.27 |
| 4,460,120 A | * | 7/1984 | Shepard et al. | 235/462.46 |
| 4,860,226 A | * | 8/1989 | Martin et al. | 235/470 |
| 4,877,948 A | * | 10/1989 | Krueger | 235/449 |
| 4,941,174 A | * | 7/1990 | Ingham | 380/52 |
| 5,184,005 A | * | 2/1993 | Ukai et al. | 235/462.16 |
| 5,245,167 A | * | 9/1993 | Takenaka | 235/462.18 |
| 5,274,567 A | * | 12/1993 | Kallin et al. | 235/379 X |
| 5,313,642 A | * | 5/1994 | Seigel | 395/75 |

FOREIGN PATENT DOCUMENTS

| | | |
|---|---|---|
| EP | 0462772 | * 12/1991 |
| JP | 54-085718 | * 7/1979 |
| JP | 55-110376 | * 8/1980 |
| JP | 01-116776 | * 6/1989 |
| JP | 08-261874 | * 10/1996 |

* cited by examiner

*Primary Examiner*—Michael G. Lee
*Assistant Examiner*—Diane I. Lee
(74) *Attorney, Agent, or Firm*—Lyon & Lyon LLP

(57) ABSTRACT

A scanner communicates with a microcomputer over a serial communications link utilizing the serial I/O port of the microcomputer. Both signals representing the data which is scanned and signals representing commands to the scanner and commands from the scanner indicative of the status thereof (e.g., scanner trigger actuation) are communicated over a plurality of lines in the communication link. These lines may be of the type utilized for transmission of data and commands in accordance with a communications protocol, such as the RS-232 protocol. Interrupts are generated when the scanner is connected to the serial port via the communication link and the microcomputer is available for decoding. Then appropriate interrupts are generated to actuate the scanner and to respond to the data. The scanner may be a laser or optical beam scanner or a wand which is moved across a bar code symbol. The symbol has bars which are relatively opaque and reflective (black or white). The microcomputer translates the data which represents the width of each bar and the number of bars and the detection of the end of a bar code symbol (Quiet Zone) into digital values which are stored in memory and presented for decoding in accordance with programming of the microcomputer which decodes the symbol. The decoded symbol may be displayed graphically, with its opaque and reflective bars and the alphanumerics which the symbol represents, on the screen of a terminal including the microcomputer.

19 Claims, 4 Drawing Sheets

Figure 1:
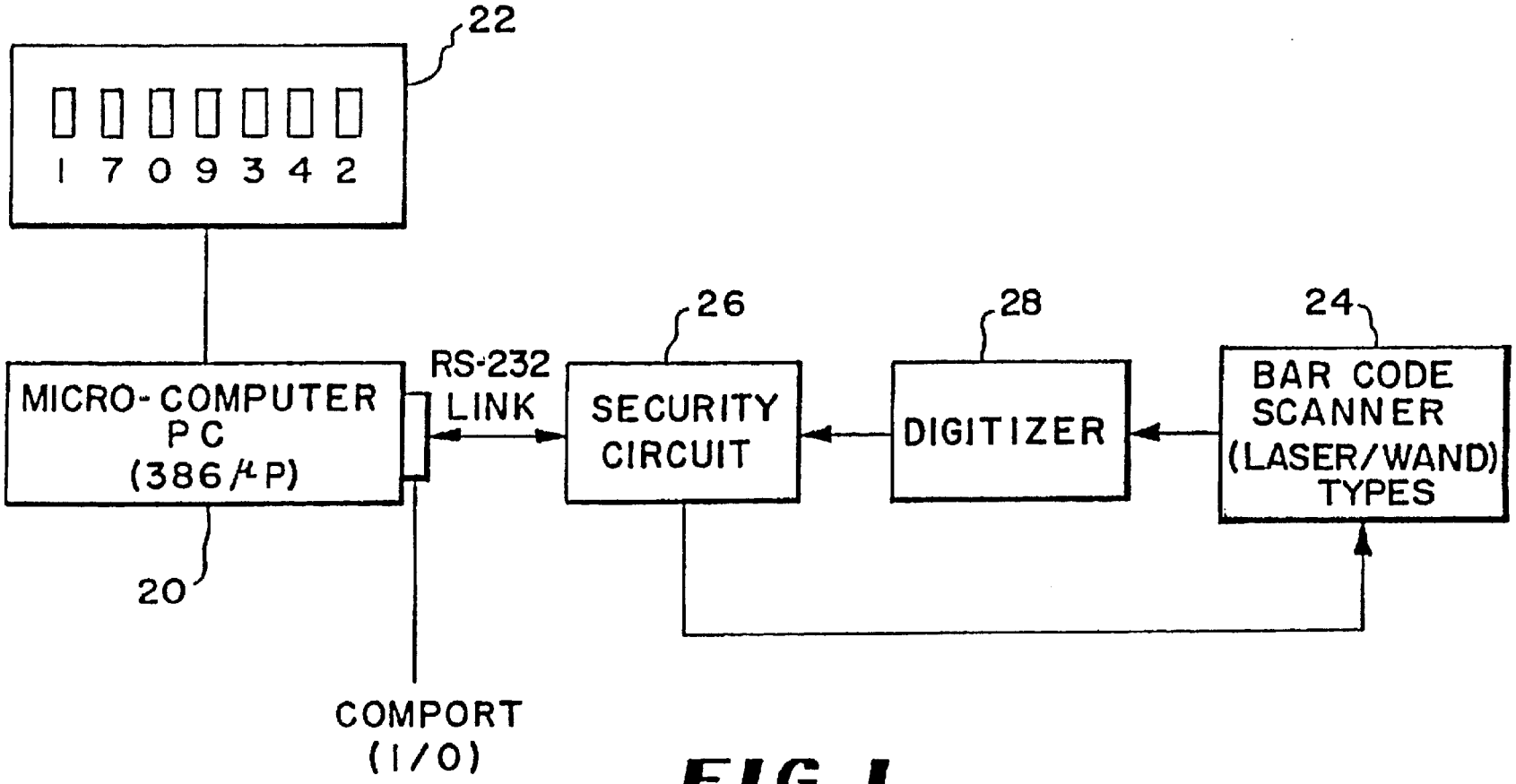
Figure 3B:
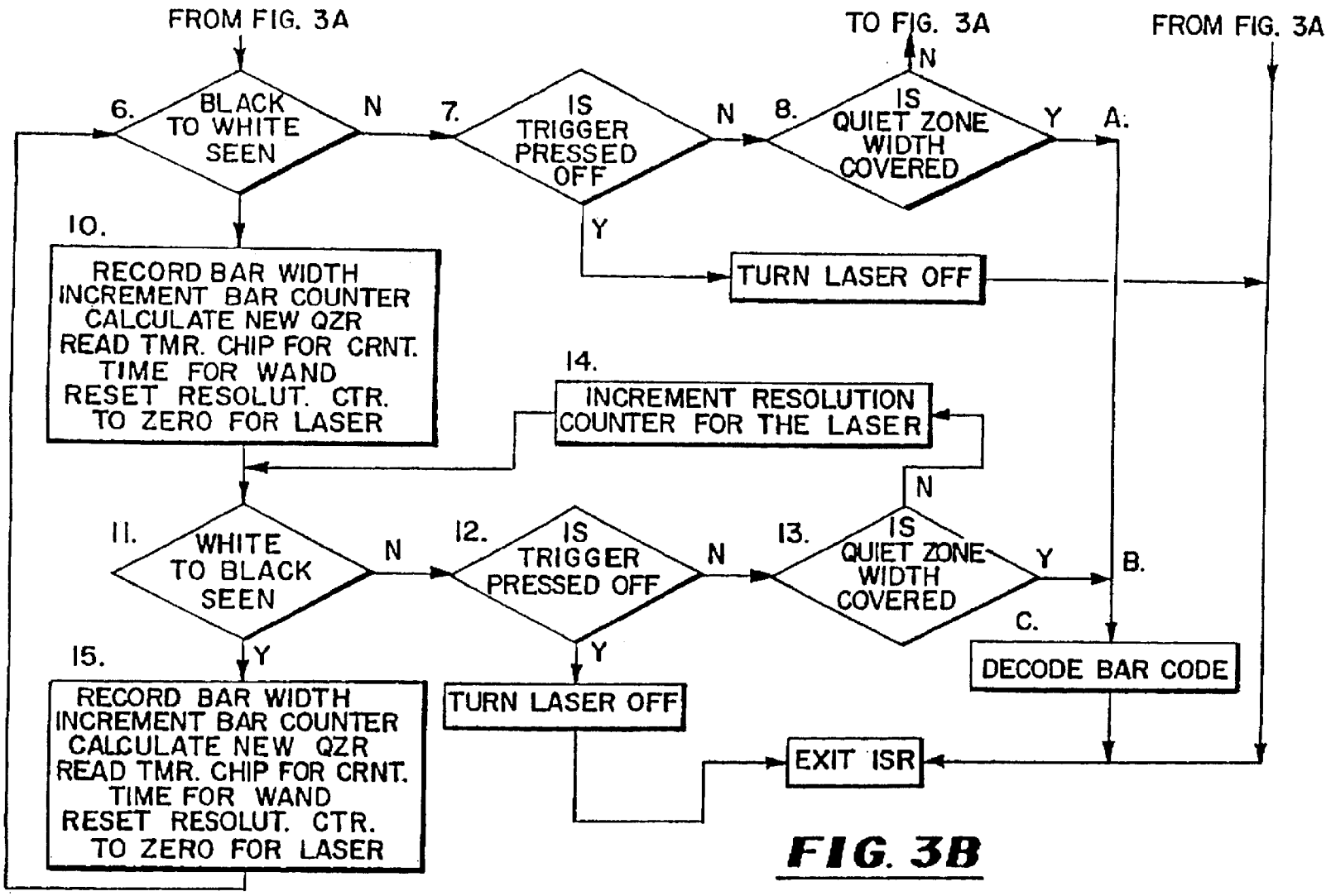

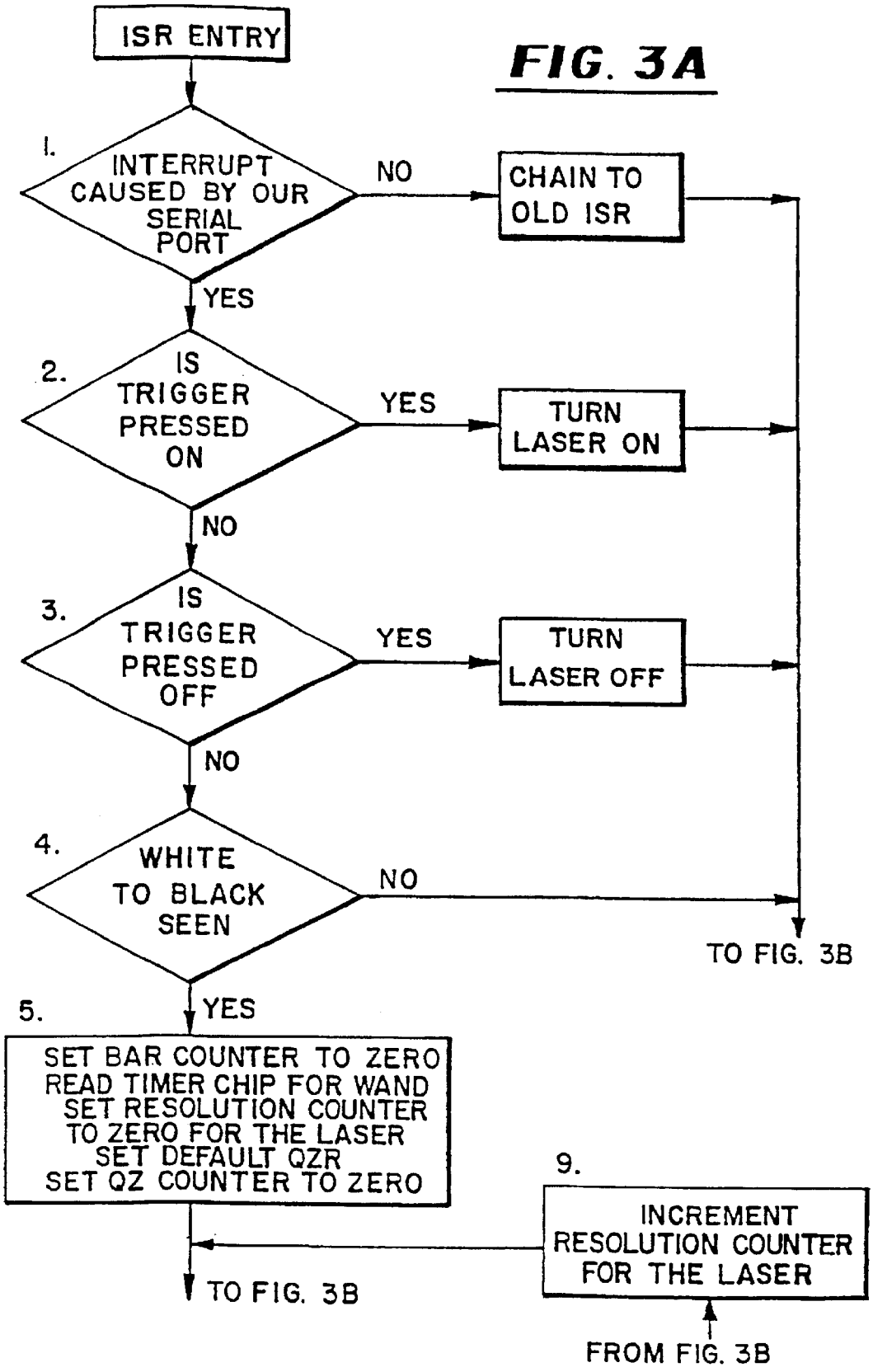
ISR ENTRY
FIG. 3A
1.
INTERRUPT CAUSED BY OUR SERIAL PORT
NO
CHAIN TO OLD ISR
YES
2.
IS TRIGGER PRESSED ON
YES
TURN LASER ON
NO
3.
IS TRIGGER PRESSED OFF
YES
TURN LASER OFF
NO
4.
WHITE TO BLACK SEEN
NO
TO FIG. 3B
YES
5.
SET BAR COUNTER TO ZERO
READ TIMER CHIP FOR WAND
SET RESOLUTION COUNTER TO ZERO FOR THE LASER
SET DEFAULT QZR
SET QZ COUNTER TO ZERO
9.
INCREMENT RESOLUTION COUNTER FOR THE LASER
TO FIG. 3B
FROM FIG. 3B

SYSTEM FOR ENABLING DECODING OF BAR CODE AND OTHER SYMBOLS WITH A DIGITAL MICROCOMPUTER CONNECTED VIA THE INPUT/OUTPUT PORT THEREOF TO THE SCANNER

Matter enclosed in heavy brackets [ ] appears in the original patent but forms no part of this reissue specification; matter printed in italics indicates the additions made by reissue.

This application is a continuation of application Ser. No. 08/283,923, filed Aug. 1, 1994, now abandoned which is a continuation of application Ser. No. 08/059,796, filed May 10, 1993 now abandoned.

DESCRIPTION

The present invention relates to a system for enabling decoding of bar codes and other symbols with a digital microcomputer which communicates with the device which scans the symbol (referred to herein as a scanner) over the communications port of the computer which is referred to sometimes as the COMPORT. The invention relates more particularly to a system for receiving interrupts from a scanner to enable signals representing the symbol to be used in the computer for decoding the data into corresponding characters and for other purposes, such as reformatting for transmission and display of the characters, of characteristics of the symbol, and of its graphical representation.

The invention is especially suitable for use with bar code scanners of the type called laser scanners or just "laser", wherein a laser beam is scanned across the code and light returned from the code during scanning is translated into data representing electrical signals in the form of pulses of varying widths corresponding to the bars of the code. The term "bars" as used herein includes relatively opaque or black bars and relatively reflective or white bars. The invention may be used with scanners of the wand type which are moved across the bar code while in contact or in close proximity therewith, either manually or by devices which move the wand or the item having the code thereon. The invention may also find application with other types of scanners such as solid state or CCD (charge coupled photoelectric device) scanners. Magnetic strip scanners may also be connected to the COMPORT and, like the laser, wand or other optical scanners, use the computer as a platform for decoding or other data processing. The invention may be practiced with various microcomputers which have COMPORTs. The computers may utilize different micro processor chips, such as the 386 or 486 chips. The computers may be desktop computers, workstation computers or laptop computers.

The invention makes use of the serial communications facilities of the computer, in particular the facility which is available at a multipin connector which is known as the COMPORT. This port may operate in accordance with the RS-232 protocol and is sometimes called the RS-232 communications port. The port is known by other names. IBM calls it the asynchronous communications adapter. The COMPORT uses special addressing space in the computer which is reserved for input/output (I/O) ports. By reading or writing to the assigned I/O port address (often called "port addresses"), the computer can control the COMPORT, read its status and read and write data bytes to and from the COMPORT hardware. This hardware is usually a UART (Universal Asynchronous Receiver/Transmitter). The UART contains the registers for the commands and data. A computer may have several COMPORTS for mouse devices or even computer game controls, such as a joystick device. The COMPORT has a way to indicate to the computer that it needs attention using a signal which "interrupts" the computer from whatever it may have been doing to tell it that the COMPORT has information the computer should process. The "interrupt" enables the computer to process data which is actually present so that it can perform other data processing tasks.

The system provided by the present invention is operative to generate the appropriate interrupts so that the computer can process data from the scanner. The computer then may be used as a platform for translating the data into a form for decoding or for other purposes. The computer is responsive to interrupts for receiving commands from the scanner and for generating commands to the scanner. In the case of a laser scanner, commands from the scanner which require attention are trigger actuations. These result in commands to commence scanning by enabling the scanner motor to operate and the laser to produce the laser beam. Other commands which are transmitted may be the good read command, which is either a visual or audible signal that a symbol (a bar code) has been properly decoded.

The invention thus combines a scanner with a computer so that the computer operates as a platform for controlling the scanner and processing data which represents symbols being scanned, which data is received from the scanner. The invention also permits the communications port of the computer to be used, and particularly the lines which carry signals for communications in accordance with the RS-232 protocol, which is a serial communications protocol in wide use. The invention permits the DTR (data terminal ready) line to be used to handle a laser enable command to the scanner. The CTS or clear to send line may be used for data representing the symbol (pulses of different width for the white or black bars in the case of a bar code). The RTS line may be used to send a command that the code has been properly decoded (for illuminating the good read LED or acoustic symbol). The carrier detect line may be used to carry the trigger commands from the scanner to the computer. Power may be carried from the scanner to the computer over one of the lines so that the scanner may be powered with operating voltage from the computer.

Another feature of the invention is that it provides facilities using the communications port for a security device which will prevent transfer of data into or out of the computer by unauthorized personnel who do not have a proper security device.

The invention, therefore, stated briefly, provides a system for processing data from a scanner representing symbols which are read by the scanner for decoding the information contained in the data. The system uses a digital microcomputer having a communications port for receiving the data via a communications link between the scanner and the port. The computer provides means, due to its programming, which is responsive to communications over the link indicating that the scanner is in communicating relationship with the computer over the link and that the computer is ready to decode the data. The computer is also programmed to provide means for transmitting and receiving commands necessary for controlling the scanner and also for translating the data into a format for decoding.

Figure 2:
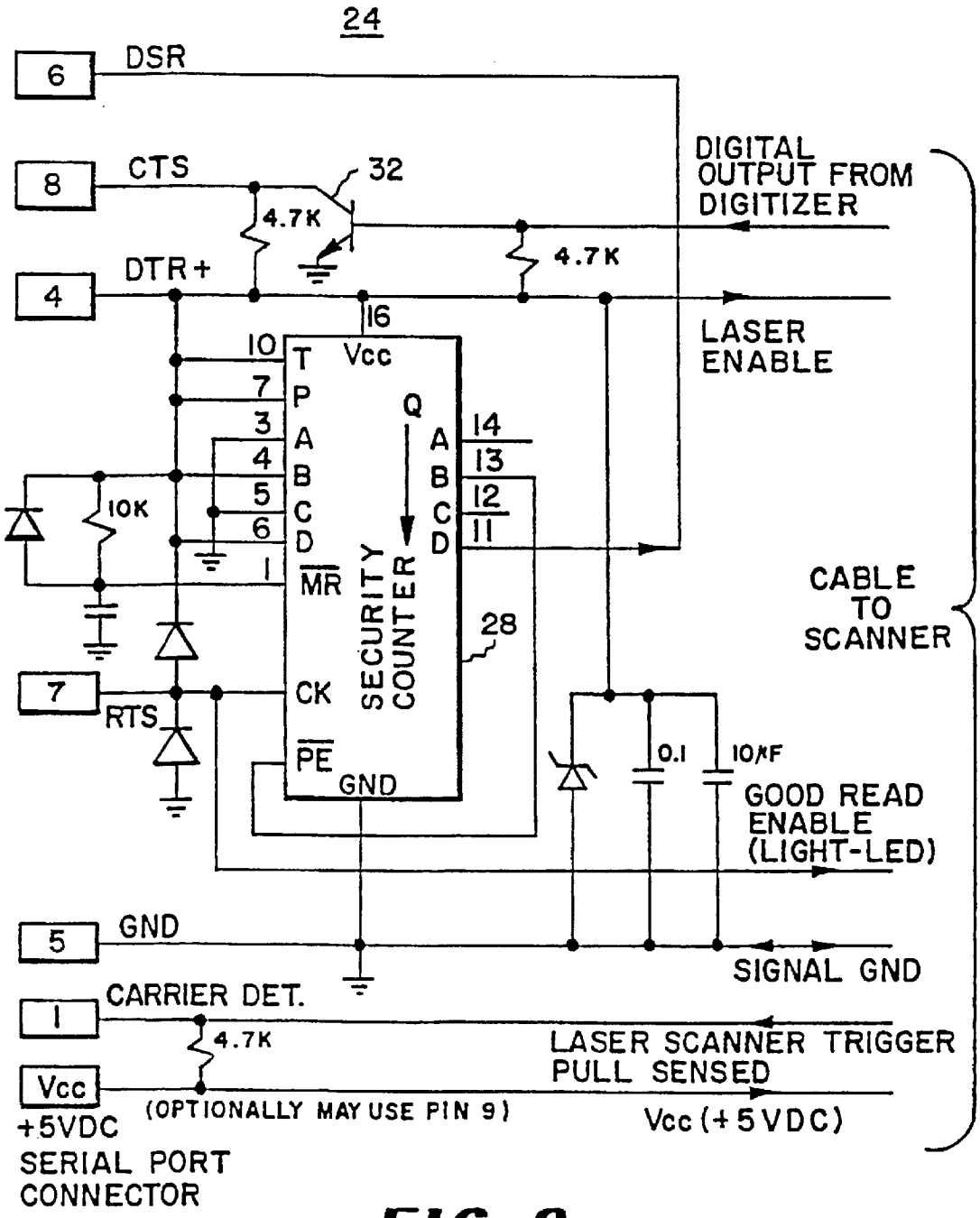

The foregoing and other advantages, features and objects of the invention will become more apparent from a reading of the following description in connection with the accompanying drawings in which:

FIG. 1 is a block diagram of a system for enabling decoding of bar codes with a digital microcomputer which embodies the invention;

FIG. 2 is a schematic diagram indicating the lines of the communication port and link in accordance with the RS-232 protocol and circuitry which provides security against unauthorized access to the computer; and FIGS. 3A and 3B are a flow chart showing the structure of the programming of the computer in order to enable its use as a platform for processing data representing bar code symbols and for controlling a bar code scanner.

Referring to FIG. 1, there is shown a microcomputer 20 which may be a general purpose, desktop personal computer (PC) with a type 386 microprocessor chip. This microcomputer is associated with a display or screen 22. This display may be driven by the microcomputer 20 and provides a graphic display of the bar code symbol which is read by a bar code scanner 24. This code contains information representing a numeral. Both the numeral and the bars of the code are entirely arbitrary and are not intended to be for a code in accordance with any standard symbology. The white and black bars are shown on the graphic display. The white bars are sometimes referred to as spaces. The numerical value "179342" on the display is the result of decoding of the data representing the bar code in the microcomputer 20.

The microcomputer has a COMPORT which is an I/O port and may have an arrangement of pins in accordance with the RS-232 protocol. These pins are nine in number. They are connected to lines on a cable or communications linked to the scanner via a security circuit 26. The scanner may include a digitizer 28, which provides the data representing signals in the form of pulses of varying width corresponding to the width of the bars of the code. Such a bar code scanner and the digitizing circuit used may be of the type described in U.S. Pat. No. 5,200,597 issued Apr. 6, 1993 to J. M. Eastman, et al.

As shown in FIG. 2, only the 9th pin or VCC line and pins 1, 4, 6, 7 and 8 of the COMPORT are used in the practice of the herein illustrated embodiment of the invention. Other lines may be used, for example, the TX line to pin 2 of the COMPORT and the RX line to pin 3 of the COMPORT. These pins may provide for alternative communication, say, for example, for data from and to a keyboard or data entry device which is used in conjunction with a bar code scanner for gathering inventory and stock information in factories and warehouses.

The security circuit includes electronic components for handling the data and commands, as well as a security counter 28, which reads the request to send (RTS) input from the computer. When that input is a predetermined sequence as determined by the inputs to the counter, A, B, C, D, P and T, and that sequence represents a predetermined or preset code stored in the counter chip 28, an enable output B (pin 13) is applied to not preset enable (not PE) and an output D (pin 11) is applied to the dataset ready (DSR) line. This enables the transfer of data to and from the microcomputer 20 and prevents unauthorized access thereto.

The other RS-232 lines which are used are the CTS or clear to send which handles the output from the digitizer 28 (the variable width pulses) which are relayed via a transitor 32 to the COMPORT. The DTR or data terminal ready is an output from the COMPORT which carries laser enable commands. The RTS line is used for the good read enable command which, in the scanner illustrated in the Eastman, et al. patent, illuminates an LED or light emitting diode, which indicates to the operator that a bar code symbol has been successfully decoded. The carrier detect line to pin 1 of the COMPORT carries the command indicating that the laser scanner's trigger has been pulled. The signal representing the command results from a switch closure as explained in the Eastman, et al. patent.

The structure of the program which enables the computer 20 to be a platform for the scanner 24 is illustrated in the flow chart of FIGS. 3A and 3B. The program is called an interrupt service routine (ISR). The interrupts are caused by various events, such as decoder availability, white to black or black to white transitions and trigger actuations and releases in the case of a laser beam scanner. The first decision occurs upon a scan or check in a UART register in which data representing decoder availability is stored, for the COMPORT which is connected via the link to the scanner, to verify that the interrupt was generated by the decoding process in the computer. If the interrupt did not come from the decoding process or if the status of the register indicates that the scanner is not connected to the COMPORT, control is passed or changed to another interrupt service routine indicated by the block labelled chain to old ISR. Then, another ISR (the old ISR) proceeds so that the computer can perform other tasks. If it was the scanner that generated the interrupt, the program continues to the second decision. The second and third decisions are provided so that a laser scanner can be serviced. If a wand is used, the second and third decisions will be in the negative and the program proceeds to the fourth decision. When the laser scanner is connected to the COMPORT, a command on the carrier detect line generate an interrupt, if any activity takes place at the trigger. If the command indicates that the trigger was pressed on, the laser and its motor which oscillates a scanning mirror and deflects the beam to scan the code, are turned on.

In the third step, the trigger command is again checked to see if the trigger was pressed off or released. If the decision is in the affirmative, the laser is powered down. Affirmative results in the second and third steps directly exit the routine and the next interrupt becomes operative. The next interrupt is due to a change in the "color" or opaqueness or reflectivity of the bars. If there is a transition from white to black (or black to white for a "negative" decoder) the interrupt is detected and the program proceeds to the fifth step.

The computer, has a software counter, called a bar counter which counts both the black and white bars for determining the number of bars in a code which is used in decoding to identify the symbol. In this connection, decoding may be programmed in accordance with specifications containing decoding algorithms, which are published by the Automatic Identification Manufacturers Association (called "AIM"). There are specification documents for each symbology. For example, for code I2 of 5, the specification is contained in a document entitled "USS-I2 of 5". For code 39, the document is identified as USS-39. These documents were available in 1986.

Returning to the fifth process, the translation routine is initialized by setting the bar counter to zero and reading a time chip (a hardware component in the computer) to get a reference of the start time of the bar. In the case of a laser scanner, a "stop watch" counter register is used for bar width resolution. The bar width is measured by counting clock pulses in the computer between transitions from white to black or black to white. This register, called a "resolution counter", is initialized to zero for laser scanning operations. The program distinguishes between laser scanners and wands due to the presence or absence of the trigger command.

Also initialized is the quiet zone width requirement (QZR). The quiet zone is the amount of space needed on both ends of the bar code so that it can be isolated for decoding. The AIM specification and similar specifications concerning UPC or uniform product codes dictate that the quiet zone be at least ten times the width of a narrow bar. The quiet zone (QZ) counter is set to zero. The counter also records the time spent in a bar. In the case of a laser scanner, this counter is the same counter as the stop watch counter register.

In the sixth decision, the transition in the opposite sense (e.g., black to white) is checked. These black to white and white to black transition signals arrive from the scanner over the CTS line as shown in FIG. 2. In the case of the laser scanner, if there is no black to white transition, the seventh decision is effected by looking at the trigger command. If the trigger has been released, the laser is turned off and the routine exit is waiting for the next interrupt. This interrupt initiates the decision process as to whether the quiet zone width has been exceeded (covered). In other words, the decision determines whether the output from the scanner digitizer qualifies it to be a quiet zone. If a quiet zone is detected, the end of the symbol is indicated and the data as to bar widths and bar counts is presented for decoding in the decode bar code process (C). The bar count byte and the bar width bytes are stored in memory space in the computer's memory and presented from the memory to the decoding process.

The width of each bar is determined by the processes indicated at 10, 11 and 15, together with the process indicated at 6. In the 10th process, the presence of the next transition, from black to white in the pulse train from the digitizer, causes the reading of the counter which stores the bar width. For the wand, this is accomplished by reading the computer's timer chip and calculating the bar width resolution from the start time and the end of the bar. For the laser scanner, the bar width resolution is the value contained in the stop watch counter register. Upon each transition, the bar counter is incremented. Also, a new quiet zone requirement (QZR), is computed based on the width of the smallest bar detected as the routine executes its bar width detection loop from processes 6 to 11 to 15 and back to 6. After the bar width is recorded, the bar width resolution counter is reset to zero, where the scanner connected to the computer's COMPORT is a laser scanner.

In the 11th process, the end of the current bar is detected. If the bar end has not been detected as yet, the 12th process, which is similar to the 7th process, is carried out. In the case of the laser, the trigger input is checked to see if the laser was turned off. If the laser is not off, the program continues to the 13th and 14th processes, which are similar to the 8th and 9th processes, which checks for the quiet zone being present, but if the quiet zone is not present, the resolution counter continues to be incremented so as to measure the width of the bar until the next transition which is the white to black transition. The bar width measuring loop includes the 15th process which is similar to the 10th process. The bar width is recorded. For the wand, this is accomplished by reading the computer's timer chip and calculating the bar width resolution from the start time and the end time of the bar. For the laser scanner, the bar width resolution is the value contained in the stop watch counter register. The bar counter is also incremented and a new QZR is calculated. When the laser scanner is connected to the COMPORT, the bar width resolution counter is also reset to zero.

If the quiet zone is detected (indicated at B, as it was indicated at A in the routine) the bar count and the bar width data bytes, which are recorded in the memory space of the computer, are presented for decoding. In other words, the bar widths, which are now translated into bytes, are decoded in accordance with the applicable decoding algorithm. These algorithms involve detection of the symbology and comparison of various combinations of the bytes with data representing characters (letters or numerals) which the bars of the code represent, and are along the lines set forth in the AIM and/or UPC specifications.

From the foregoing description, it will be apparent that there has been provided an improved system for handling and processing data representing symbols which are read by a scanner, which enables a microcomputer, of the type which is generally available, to be used as a platform for decoding, reformatting, displaying and otherwise characterizing the symbol. Variations and modifications in the herein described system, within the scope of the invention, will undoubtedly suggest themselves to those skilled in the art. Accordingly, the foregoing description should be taken as illustrative and not in a limiting sense.

We claim:

1. A computer system operable as a platform for symbol reading scanners so that the computer controls a scanner and processes data from the scanner representing symbols read by the scanner for decoding the symbols into information corresponding thereto, said system comprising:

a general purpose computer separate from the scanner and having a communications port connectable to the scanner for receiving undecoded data representing the symbols via a communications link between the scanner and the port;

means in said computer responsive to said communications over said link indicating that the scanner is in data communicating relationship with said computer over said link and that said computer is ready to decode the data;

means in said computer for transmitting and receiving commands necessary for controlling the scanner;

means for translating said data into a format for decoding; and means connected in said link for preventing unauthorized transfer of data into and out of said computer.

2. The system according to claim 1 wherein:

said link has a plurality of lines;

said computer has means for transmitting signals over a first of said lines and for receiving signals from the scanner over a second of said lines; and said means for preventing unauthorized transfer includes means responsive to a predetermined sequence of signals transmitted over said first line for providing an output on said second line to authorize said computer to transfer data.

3. The system according to claim 2 wherein said signals carried over said first line represent requests from said computer to send signals, and said computer receives signals representing readiness to receive data over said second line.

*4. A method for reading data with the assistance of a general purpose computer, comprising the steps of:*

*detecting light incident on a photodetector of a peripheral reading device, and generating an electrical signal thereby;*

*generating, from said electrical signal, digital data comprising pulse width information corresponding to widths of light features and dark features of a target imaged by said photodetector;*

*transferring said digital data via a bidirectional communication port to a general purpose computer;*

*timing the widths of said pulses, and generating a plurality of width measurement values thereby; and*

*decoding a symbol according to said width measurement values using a processor of said general purpose computer.*

*5. The method of claim 4, wherein the step of detecting an amount of light incident on a photodetector comprises the step of detecting light incident on a charge-coupled device.*

*6. The method of claim 4, wherein said step of timing the widths of said pulses, and generating a plurality of width measurement values thereby, comprises the step of resetting a stopwatch timer at points in time corresponding to high and low state transitions in said electrical signal, and recording pulse width time values from the stopwatch timer immediately before the stopwatch timer is reset.*

*7. The method of claim 4, further comprising the step of counting a number of features in said symbol using said general purpose computer.*

*8. The method of claim 4, further comprising the step of transmitting a signal from said general purpose computer via said bidirectional communication port to said peripheral reading device indicating that a symbol has been properly decoded.*

*9. The method of claim 4, wherein said peripheral reading device comprises either an optical beam scanner or a wand, and wherein said method further comprises, for said optical beam scanner, the step of sweeping an optical beam across said symbol, and for said wand, the step of moving said wand across said symbol.*

*10. The method of claim 4, further comprising the step of transmitting a unique series of binary digits from said peripheral reading device to said bidirectional communication port prior to transmitting said digital data to said general purpose computer.*

*11. The method of claim 4, wherein said step of transferring said digital data via a bidirectional communication port to a general purpose computer comprises the step of transferring said digital data via a serial communication port to the general purpose computer.*

*12. The method of claim 11, wherein said communication path comprises a serial communication path.*

*13. A method of interfacing a peripheral reading device and a general purpose computer, comprising the steps of:*

*detecting light incident on a photodetector of a peripheral reading device, and generating an electrical signal in response thereto;*

*generating, from said electrical signal, a binary signal comprising pulse width information indicating widths of relatively light regions and relatively dark regions of a target imaged by said photodetector;*

*transmitting, via a communication path, a code sequence from said peripheral reading device to a general purpose computer;*

*transmitting, via said communication path, said binary signal from said peripheral reading device to said general purpose computer; and*

*processing said binary signal at said general purpose computer only if said code sequence matches a predetermined code sequence.*

*14. A system for reading data, comprising:*

*a photodetector, said photodetector outputting an electrical signal;*

*a digitizer connected to said photodetector, said digitizer outputting a binary signal having transitions between high and low states at points in time corresponding to transitions between lighter and darker regions of a symbol imaged by said photodetector;*

*a timer for measuring feature widths of said binary signal, said timer generating a series of pulse width values indicating widths of features of said binary signal; and*

*a general purpose computer, said general purpose computer comprising a bidirectional serial port, a processor and a memory, said processor responsive to programmed instructions for decoding a symbol according to the measured feature widths of said binary signal, and said processor outputting data over said bidirectional serial port.*

*15. The system for reading data of claim 14, wherein said photodetector comprises a charge-coupled device (CCD).*

*16. The system for reading data of claim 14, further comprising a counter responsive to said binary signal for storing a total number of features of said symbol being imaged.*

*17. The system for reading data of claim 14, further comprising a good read signal output from said general purpose computer via said serial port to a peripheral reader comprising said photodetector, said good read signal indicating that a symbol has been successfully decoded.*

*18. The system for reading data of claim 14, further comprising either a flying spot optical beam or a manually held wand for illuminating the symbol.*

*19. The system for reading data of claim 14, wherein said photodetector is part of a peripheral reading device, said peripheral reading device comprising a code generator outputting a predetermined code to the serial port of said general purpose computer prior to said general purpose computer receiving said measured feature widths.*

* * * * *